United States Patent [19]

Yoshida et al.

[11] Patent Number: 4,962,002
[45] Date of Patent: Oct. 9, 1990

[54] CERAMIC-METAL COMPOSITE BODIES, AND PROCESS AND APPARATUS FOR MANUFACTURING THE SAME

[75] Inventors: Akihiko Yoshida, Iwakura; Yoshizumi Nakasuji, Nagoya, both of Japan

[73] Assignee: NGK Insulators, Ltd., Japan

[21] Appl. No.: 373,693

[22] Filed: Jun. 29, 1989

Related U.S. Application Data

[63] Continuation of Ser. No. 125,361, Nov. 25, 1987, abandoned.

[30] Foreign Application Priority Data

Dec. 2, 1986 [JP] Japan .................................. 61-285974

[51] Int. Cl.$^5$ ........................... B23P 19/02; F16B 4/00
[52] U.S. Cl. ..................................... 428/609; 29/447; 29/238; 29/800; 403/30
[58] Field of Search ................. 29/DIG. 44, 428, 447, 29/469.5, 468, 520, 522.1, 238, 800; 228/221; 428/544, 621, 457, 469, 472, 609; 403/30, 404, 273

[56] References Cited

U.S. PATENT DOCUMENTS

| | | | |
|---|---|---|---|
| 2,229,436 | 1/1941 | Beggs | 29/DIG. 44 |
| 2,279,854 | 4/1942 | Whitney | 29/DIG. 44 |
| 3,241,230 | 3/1966 | Batista et al. | 29/494 |
| 3,656,225 | 4/1972 | Bereza | 228/221 |
| 3,909,591 | 9/1975 | Ulam | 24/DIG. 44 |
| 4,186,473 | 2/1980 | Cross et al. | 29/DIG. 44 |
| 4,251,252 | 2/1981 | Frazier | 228/221 |
| 4,614,453 | 9/1986 | Tsuno et al. | 403/30 |
| 4,630,361 | 12/1986 | Inagaki | 228/221 |
| 4,690,617 | 9/1987 | Oda et al. | 403/30 |
| 4,722,125 | 2/1988 | Peng | 228/221 |
| 4,747,722 | 5/1988 | Kawaguchi et al. | 403/273 |
| 4,798,493 | 1/1989 | Oda et al. | 403/273 |
| 4,854,025 | 8/1989 | Oda et al. | 29/447 |
| 4,887,493 | 12/1989 | Drake | 29/800 |

FOREIGN PATENT DOCUMENTS

| | | |
|---|---|---|
| 0139406 | 5/1985 | European Pat. Off. |
| 0142334 | 5/1985 | European Pat. Off. |
| 683859 | 11/1939 | Fed. Rep. of Germany ...... 228/221 |
| 1427284 | 3/1976 | United Kingdom |
| 2173138 | 10/1986 | United Kingdom |

OTHER PUBLICATIONS

Japanese Patent Appln. Laid Open No. 60-77,180.
Japanese Utility Model Appln. Laid-Open No. 61-43,901.
Japanese Utility Model Appln. Laid-Open No. 60-45,833.
Japanese Utility Model Appln. Laid-Open No. 59-8,730.

*Primary Examiner*—John J. Zimmerman
*Attorney, Agent, or Firm*—Arnold, White & Durkee

[57] ABSTRACT

Ceramic-metal composite bodies and a process for the production thereof are disclosed. The ceramic-metal composite body includes a metallic member and a ceramic member which are integrally joined together by fitting a projection formed on the ceramic member to a recess formed in the metallic member. The projection of the ceramic member is fitted and joined into the recess of the metallic member in a vessel of which the inside is kept at an atmosphere having a pressure lower than an atmospheric pressure. The pressure of air remaining in a space left between the recess and the fitted projection is lower than that of the air in the space when the projection is fitted into the recess in the atmospheric pressure. An apparatus for fitting and joining the projection of the ceramic member to the recess of the metallic member is also disclosed, which includes a pressure-reducible vessel which is provided with a space for receiving at least the projection of the ceramic member and the recess of the metallic member, a sealing structure including O-rings or the like, a pipe opening for exhausting air inside the vessel, and a movable push rod for pressing and fitting the projection of the ceramic member into the recess of the metallic member.

4 Claims, 2 Drawing Sheets

FIG_3
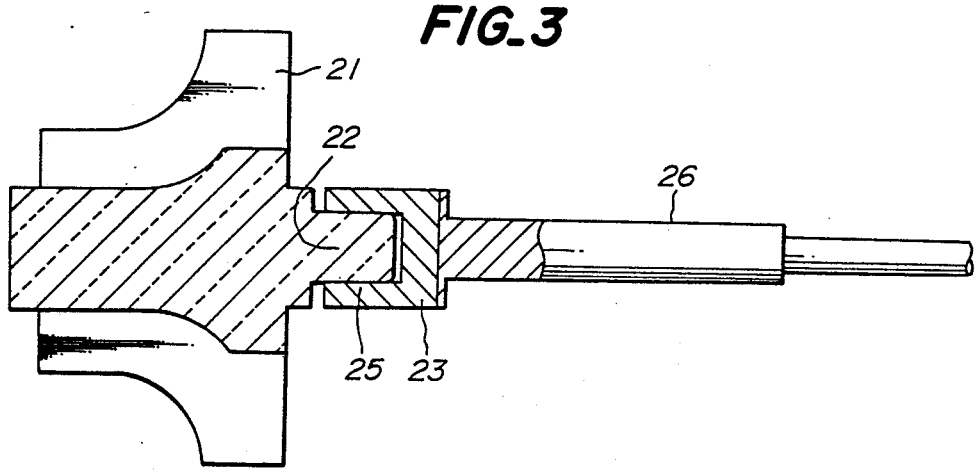
FIG_4
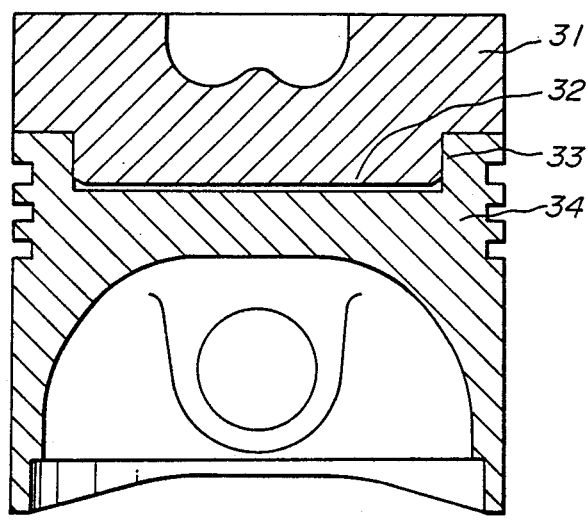

CERAMIC-METAL COMPOSITE BODIES, AND PROCESS AND APPARATUS FOR MANUFACTURING THE SAME

This is a continuation of application Ser. No. 07/125,361 filed Nov. 25, 1987, now abandoned.

BACKGROUND OF THE INVENTION (1) Field of the Invention:

The present invention relates to a process for joining ceramic members to metallic members through fitting. More particularly, the invention relates to a process for fitting and joining ceramic members to metallic members through press fitting, shrinkage fitting, expansion fitting, brazing or a combination thereof. Further, the present invention relates to composite bodies of ceramic members and metallic members produced by the above production process, for instance, the ceramic-metal composite bodies being rotary shafts for turbocharger rotors or gas turbine rotors.

The invention also relates to a joining apparatus used for effecting the above-mentioned process.

(2) Related Art Statement:

Recently, ceramic members have been used, for example, as turbine wheels in turbochargers and the like because of their excellent heat resistance, and rotary shafts of metallic members have been used as shafts for the ceramic members. The turbine wheel of a ceramic member is joined to the rotary shaft of a metallic member, for instance, by providing a recess at one end portion of the rotary shaft of the metallic member in an axial direction thereof, and fitting and joining a projection formed on the center portion of a back face of the turbine wheel of the ceramic member to the recess through shrinkage fitting, brazing or the like.

In such a joining structure, air is compressed in a space remaining in the recess after the joining and high pressure air is trapped therein. Therefore, press fitting, shrinkage fitting and the like have a drawback in that when a temperature rises at the joint portion, the projection slips off from the recess due to expansion of the trapped air. On the other hand, the brazing has a drawback in that the trapped air enters a joining interface between a brazing material and the ceramic member or between the brazing material and the metallic member so that a bonding area becomes smaller, alignment between the members to be joined together is deteriorated, or the fitting becomes insufficient, thereby resulting in poor joining.

As techniques for eliminating the abovementioned drawbacks, there have been proposed a joining structure in which a single air escape hole is provided passing from near a bottom face of a space inside a recess formed in a rotary shaft of a metallic member to a bottom end of the outer periphery of the recessed portion of the rotary shaft or near this bottom end (Japanese utility model registration application Laid-open No. 59-8,730 and Japanese patent application No. 60-77,180) and a joining structure in which a plurality of radial air escape holes are formed at an equal interval in a circumferential direction communicating with a space remaining at a deep portion of a recess in a rotary shaft of a metallic member (Japanese utility model registration application Laid-open No. 60-45,833).

However, the above two kinds of joining structures have the following problems.

That is, the joining structures described in Japanese utility model registration application Laid-open No. 59-8,730 and Japanese patent application Laid-open No. 60-77,180 have problems in that the shaft is vibrated during high speed rotation of the composite body. Further the rotary shaft of the composite body rotates under swing in an extreme case due to an unbalanced mass of the ceramic-metal composite body around a rotary shaft, because of a single air escape hole, as well as due to an unbalanced mass of the ceramic-metal composite body around the rotary shaft because of a bearing-lubricating lubricant which enters the space left in the recess through the air escape hole during a tie-up of rotation or a low speed rotation of the rotary shaft of the composite body and remains in the recess.

On the other hand, the joining structure of Japanese utility model registration application Laid-open No. 60-45,833 has a problem in that while the above-mentioned unbalanced mass of the composite body around the rotary shaft is to be eliminated by the provision of the air escape holes at the equal interval in the circumferential direction, the strength of the metallic rotary shaft and the joining strength decrease, because a plurality of the air escape holes are provided near the bottom of the recess in the rotary shaft of the metallic member.

SUMMARY OF THE INVENTION

It is an object of the present invention to provide a ceramic-metal composite body in which a projection formed on a ceramic member is integrally joined to a recess formed in a metallic member through fitting in the state that no compressed air is contained in a space remaining at a fitted portion without a provision of a hole near the fitted portion.

It is another object of the present invention to provide a process for producing such ceramic-metal composite bodies.

It is still another object of the present invention to provide a joining apparatus for effecting such a producing process.

According to a first aspect of the present invention, there is provided a ceramic-metal composite body in which a projection formed on a ceramic member is joined to a recess formed in a metallic member in the state that a pressure of air contained in a space remaining between the projection and the recess after the joining is lower than that of air remaining in the space when the ceramic member is fitted to the metallic member at an atmospheric pressure.

According to a second aspect of the present invention, there is provided a process for producing a ceramic-metal composite body by integrally joining a projection formed on a ceramic member to a recess formed in a metallic member through fitting, said process comprising a step of fitting and joining the projection of the ceramic member to the recess of the metallic member in a vessel which is held at an atmosphere having a pressure lower than an atmospheric pressure.

According to a third aspect of the present invention, there is provided a joining apparatus for fitting and joining a projection formed on a ceramic member to a recess formed in a metallic member, which apparatus comprises a sealed type vessel which contains a hollow space in which at least a projection formed on a ceramic member and a recess formed in a metallic member may be located and which may be pressure-reduced to a pressure lower than an atmospheric pressure, a sealing structure comprising O-rings or the like for assuring a gas-tight state in of the vessel, an opening for exhausting a gas inside the vessel, and a slidable push rod for pressing and fitting the projection of the ceramic member to the recess of the metallic member relative to each other.

The ceramic-metal composite bodies produced by the above-mentioned process are characterized in that the pressure of air remaining in the space left between the recess of the metallic member and the projection of the ceramic member is lower than that of air remaining in the space when the fitting is effected at an atmosphere having the atmospheric pressure.

These and other objects, features, and advantages of the present invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 3 is a partial sectional view illustrating an embodiment in which a ceramic-turbocharger rotor embodies the present invention; and FIG. 4 is a partial sectional view illustrating another embodiment in which a piston embodies the present invention.

DETAILED DESCRIPTION OF THE INVENTION

According to the process for producing the ceramic-metal composite bodies in the present invention, the fitting is performed in a vessel of which the inside is kept at an atmosphere having a pressure lower than atmospheric pressure (1 atm). Thus, the pressure of compressed air remaining in the space left between the recess of the metallic member and the projection of the ceramic member after the fitting is lower as compared to the fitting at an atmosphere having the atmospheric pressure. Thereby, a sufficient joining strength can be maintained fully in a wide temperature range from room temperature to high temperatures. In addition, when the members are bonded together by brazing, it is possible to prevent reduction in a bonding area, deterioration in an alignment between the members to be bonded, poor fitting dimension, etc. due to invasion of the compressed air into a bonding interface between a brazing material and the ceramic member or between the brazing material and the metallic member. Furthermore, it is possible to omit machining of an air escape hole penetrating the inside the recess of the metallic member as formerly provided. The fitting is effected in the vessel held preferably at an atmosphere having a pressure of not more than 400 Torr. The fitting is more preferably effected in the vessel held at an atmosphere having a pressure of not more than 100 Torr.

Since in the ceramic-metal composite bodies produced by the above-mentioned process, the pressure of the compressed air remaining in the space left between the recess of the metallic member and the projection of the ceramic member after the fitting is sufficiently lower than the joining strength, the ceramic-metal composite bodies do not suffer slipping off in a wide temperature range of use. Moreover, no air escape hole is necessary. Thus, when the ceramic-metal composite bodies are to be used as rotary shafts, they are free from an unbalanced mass around the rotary shaft due to the presence of the air escape hole or the unbalanced mass around the rotary shaft due to a lubricant entering the space through the air escape hole. Consequently, the shaft is not vibrated due to the above unbalances during high speed rotation of the rotary shaft of the composite body.

Figure 2:
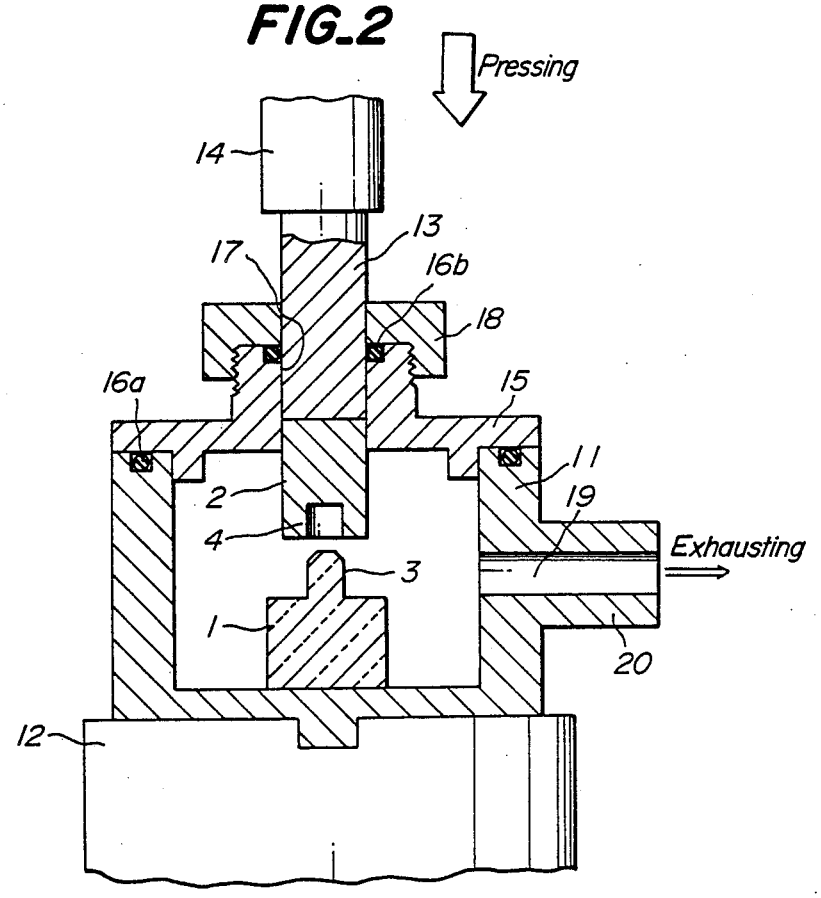
FIG. 2 is a schematic view of a joining apparatus used for effecting the producing process of the present invention.

With reference to a schematic view shown in FIG. 2, a process will be explained below for producing a ceramic-metal composite body by fitting a ceramic member 1 into a metallic member 2 in a vessel of which the inside is held at an atmosphere having a pressure lower than an atmospheric pressure. A projection 3, which has a diameter smaller than the outer diameter of the ceramic member 1, is formed at one end of the ceramic member 1. On the other hand, a recess 4 is axially formed in one end portion of the metallic member 2 at a center of a shaft.

First, the ceramic member 1 having the projection 3 is placed in a sealing type vessel 11 which may be pressure-reduced to an atmosphere having a pressure lower than atmospheric pressure. The vessel 11 is fixed on a bench 12 of a press. A slidable push rod 13 is provided in an upper lid 15 at the upper portion of the vessel 11, extending inside and outside of the vessel 11. The metallic member 2 with the recess 4 is attached to one end of the push rod 13 which is located inside the vessel, such that the former is attached to the latter on a flat surface opposite to an opening end of the recess. The other end of the push rod 13 positioned outside the vessel contacts with an arm 14 of the press.

The ceramic member, the metallic member and the push rod are so arranged that the projection 3 of the ceramic member 1 arranged inside the vessel 11, the recess 4 of the metallic member 2 attached to the push rod 13, and the push rod 13 may be aligned in a straight line.

The upper lid 15 of the pressure-reducing vessel 11 is sealed with an O-ring 16a to keep gas tightness inside the vessel 11. The upper lid 15 is provided at the center, with an opening 17 through which the push rod 13 is slidable. An O-ring 16b is arranged between an opening wall at the upper end face and the push rod so as to prevent surrounding air from entering the vessel through a space between the opening wall 17 and the push rod 13. An O-ring push member 18 is placed onto the upper end face of the opening.

An opening 19 for an air exhausting pipe is provided in a wall of the pressure-reducible vessel 11. Air inside the vessel is exhausted through an exhausting pipe 20 connected to the opening 19 by using a vacuum pump, an aspirator or the like (not shown) connected to the exhausting pipe 20, thereby pressure-reducing the atmosphere inside the vessel to a pressure lower than the atmospheric pressure.

Then, the push rod 13 is pushed down through the arm 14 by the press (not shown). Consequently, the recess 4 of the metallic member 2 attached to the end of the push rod 13 is pushed down to cause the projection 3 of the ceramic member 1 to be press fitted thereinto by a specific press fit distance. As explained above, the ceramic member is fitted and jointed to the metallic member.

The present invention will be explained in more detail with reference to specific examples. These examples are given merely in illustration of the invention, but should never be interpreted to limit the scope thereof.

Figure 1:
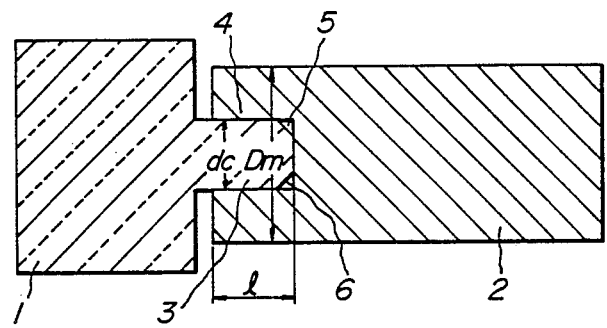
FIG. 1 is a partial sectional view of a ceramic-metal composite body produced according to the present invention.

Example 1:

A ceramic-metal composite body shown in FIG. 1 was actually produced by joining a projection 3 formed on a ceramic member 1 made of silicon nitride ($Si_3N_4$) into a recess 4 formed in a metallic member 2 made of aluminium-chrome-molybdenum-steel (JIS-SACM645) by press fitting in a vessel held at room temperature in a pressure-reduced atmosphere. The projection 3 of the ceramic member 1 had an outer diameter $d_c=10$ mm and a length of 10 mm, and a taper portion 6 was formed at a tip end of the projection 3 at an angle of 45°. The recess 4 of the metallic member 2 had an outer diameter $Dm=16$ mm, an inner diameter of 9.93 mm, and a depth $l=9.5$ mm. The press fitting was carried out such that a volume of a space 5 remained between the recess 4 of the metallic member 2 and the projection 3 of the ceramic member 1 fitted therein might be about 20 mm³. In order to examine an influence of compressed air remaining in the residual space 5 after the press fitting, the ceramic-metal composite bodies press-fitted in the vessel held at an atmosphere having a pressure shown in Table 1 were left in a high temperature atmosphere at 450° C. for 1 hour. The total lengths of the ceramic-metal composite bodies and the concentricity of the outer periphery of the ceramic member with reference to the outer periphery of the metallic member before and after the leaving were measured. Results are shown in the following Table 1.

TABLE 1

| Pressure of atmosphere inside vessel (Torr) | 760 | 600 | 400 | 300 | 100 | 10 | 1 | $10^{-1}$ |
|---|---|---|---|---|---|---|---|---|
| Rate of "slipped" | 20/180 | 3/40 | 0/40 | 0/40 | 0/40 | 0/40 | 0/40 | 0/40 |
| Rate of "deviated" | 30/180 | 5/40 | 1/40 | 1/40 | 0/40 | 0/40 | 0/40 | 0/40 |

"Slipped" denotes a case where the projection 3 of the ceramic member 1 completely separated from the recess 4 of the metallic member 2 as well as a case where the entire length of the ceramic-metal composite body prolonged. "Deviated" denotes a case where the above concentricity varied by 2 μm or more. In Table 1, a total number of samples measured and a number of samples which suffered slipping or deviation are shown by figures on the right and left sides to an oblique line, respectively.

As understood from Table 1, the press fitting may be effected in the vessel held preferably at an atmosphere having a pressure of 400 Torr as compared with a case where the press fitting is effected in an atmosphere having the atmospheric pressure. Further, it is understood that the press fitting may be effected in the vessel held more preferably at an atmosphere having a pressure of not more than 100 Torr.

That is, as the atmosphere pressure during the press fitting becomes lower, the pressure of the compressed air remaining in the residual space 5 between the recess 4 of the metallic member 2 and the projection 3 of the ceramic member 1 fitted therein after the press fitting preferably becomes lower by a degree corresponding to reduction in the atmosphere pressure during the press fitting. It can be understood that the bonding strength depends upon the shapes, materials, an interference, use temperatures, etc. of members to be joined together, a volume of a space remaining between the recess 4 and the projection 3 fitted therein after the press fitting, and the atmosphere pressure during the press fitting. The atmosphere pressure at the time of the press fitting may be appropriately selected with reference to various specific examples. With respect to gases other than air in the atmosphere during the press fitting, needless to say, the atmosphere pressure may be determined according to the above-mentioned concept.

Example 2:

FIG. 3 is a partial sectional view illustrating an embodiment in which a ceramic turbocharger rotor embodies the present invention. A projection 22 of 13 mm in outer diameter and 14 mm in length of a ceramic rotor 21 made of $Si_3N_4$ having 41 mm in diameter was press fitted into a recess 25 of 18 mm in outer diameter, 12.9 mm in inner diameter, and 13 mm in depth of a metallic member 23 made of a low heat expansion metal Fe-Ni-Co-Nb alloy [Incoloy 909 (tradename)] in a vessel maintained at room temperature in an atmosphere pressure of 10 Torr. The metallic member 23 was joined to one end of another metallic member 26 made of nickel-chrome-molybdenum steel (JIS-SNCM439) through frictional welding. The thus joined ceramic turbocharger rotor was subjected to an age hardening treatment (720° C×8 hours+620° C×8 hours) for Incoloy 909. As a result, although the projection 22 of a ceramic turbocharger rotor having been press fitted in the atmospheric pressure after the age hardening treatment was slipped off from the recess 25 of the metallic member 23, the ceramic turbocharger rotor in Example 2 has not suffered from the above slipping off.

Further, the ceramic turbocharger rotor in this Example was assembled into a high temperature rotation tester, and was subjected to a rotary test at a number of revolution of 120,000 rpm for 50 hours with a combustion gas at 800° C. However, the test was terminated, the shaft vibration of the turbocharger rotor according to the present invention was not large, and abnormality of slipping off or shaft deviation was not observed.

Example 3:

FIG. 4 is a partial sectional view illustrating an application of the present invention to a piston. In this embodiment, a cylindrical projection 32 having 55 mm in outer diameter and 15 mm in length provided on a piston crown 31 made of PSZ (partially stabilized zirconia) of 69 mm in diameter was press fitted into a recess 33 having 54.8 mm in inner diameter and 15 mm in depth provided in a top portion of a piston body 34 made of a nodular graphite cast iron 34 in a vessel maintained at 350° C. in an atmosphere having a pressure of 100 Torr.

The piston in this embodiment was assembled into a diesel engine having a cylinder bore of 70 mm and a stroke of 75 mm, which was subjected to a running test at a engine speed of 2,200 rpm for 100 hours. Unlike a piston obtained through press fitting in an atmosphere having atmospheric pressure, the piston crown 31 did not slip off from the recess 33. No abnormality was observed after the termination of the test.

The present invention is not limited to the above-mentioned embodiments, but various modifications, variations and changes of the same could be made. For instance, Si₃N₄ or PSZ was used as ceramic members, but the invention is not limited to these ceramic materials. Silicon carbide, sialon, mullite, alumina, beryllia, and the like, may be used. Further, the metallic members are not limited to the above-mentioned embodiments, but as a matter of course, other metals may be used.

According to the present invention, since the projection formed on the ceramic member is fitted and joined to the recess formed in the metallic member in the vessel kept at an atmosphere having a pressure lower than atmospheric pressure, a sufficient joining strength can be maintained over a wide temperature range from room temperature to high temperatures. In addition, in the case of the bonding such as the brazing, the present invention provides superior joining. Moreover, machining of the conventional air escape holes to be formed to communicate with the inside of the recess of the metallic member can be omitted. Since no air escape hole is necessary, the mechanical strength of the ceramic-metal composite body is not deteriorated. Moreover, the balance in the mass around the rotary shaft can be improved when the composite body is used as a rotary shaft. Thus, no shaft vibration due to an unbalanced mass around the rotary shaft occurs at high speed rotation.

What is claimed is:

1. A process for producing a ceramic-metal composite body by integrally joining a projection formed on a ceramic member to a recess formed in a metallic member through a fitting technique selected from the group consisting of press fitting, shrinkage fitting, expansion fitting, and a combination thereof, said process comprising fitting and joining the projection of the ceramic member into the recess of the metallic member while said members are disposed in a vessel maintained in an atmosphere having a pressure of not more than 400 Torr.

2. A ceramic-metal composite body comprising a ceramic member with a projection formed thereon and a metallic member with a recess formed therein, said projection being integrally joined to said recess through a fitting while the members are disposed in a vessel maintained in an atmosphere having a pressure of not more than 400 Torr, wherein a pressure of air remaining in a space between said recess and said projection fitted therein is lower than a pressure of air remaining in said space when the fitting is preformed in said atmospheric pressure.

3. A ceramic-metal composite body according to claim 2, wherein said composite body is a rotary shaft of a rotor selected from the group consisting of a turbocharger and a gas turbine.

4. A method of using an apparatus for joining a projection formed on a ceramic member to a recess in a metallic member,
   said apparatus comprising:
   (i) a sealing vessel consisting essentially of a unitary body which defines an internal volume for receiving at least the projection of the ceramic member and the recess of the metallic member, and a vessel lid sealed to an open top portion of said vessel body via a first O-ring member;
   (ii) a movable push rod for pressing and fitting the projection of the ceramic member into the recess member of the metallic member, said push rod being slidably supported through said vessel lid and being operable in a single, constant axial direction which is coaxial with said projection and said recess, said push rod being sealed to said vessel lid via a second O-ring member; and
   (iii) an exhausting pipe opening for exhausting air inside said internal volume;
   said method comprising:
   (a) maintaining an atmosphere contained in said internal volume at a pressure of not more than 400 Torr; and
   (b) joining the projection of the ceramic member to the recess of the metallic member by pressing the projection into the recess.

* * * * *